Aug. 9, 1949.  W. J. MORRIS, JR  2,478,704
RESILIENT MOTOR MOUNTING
Filed Dec. 29, 1944  2 Sheets-Sheet 1
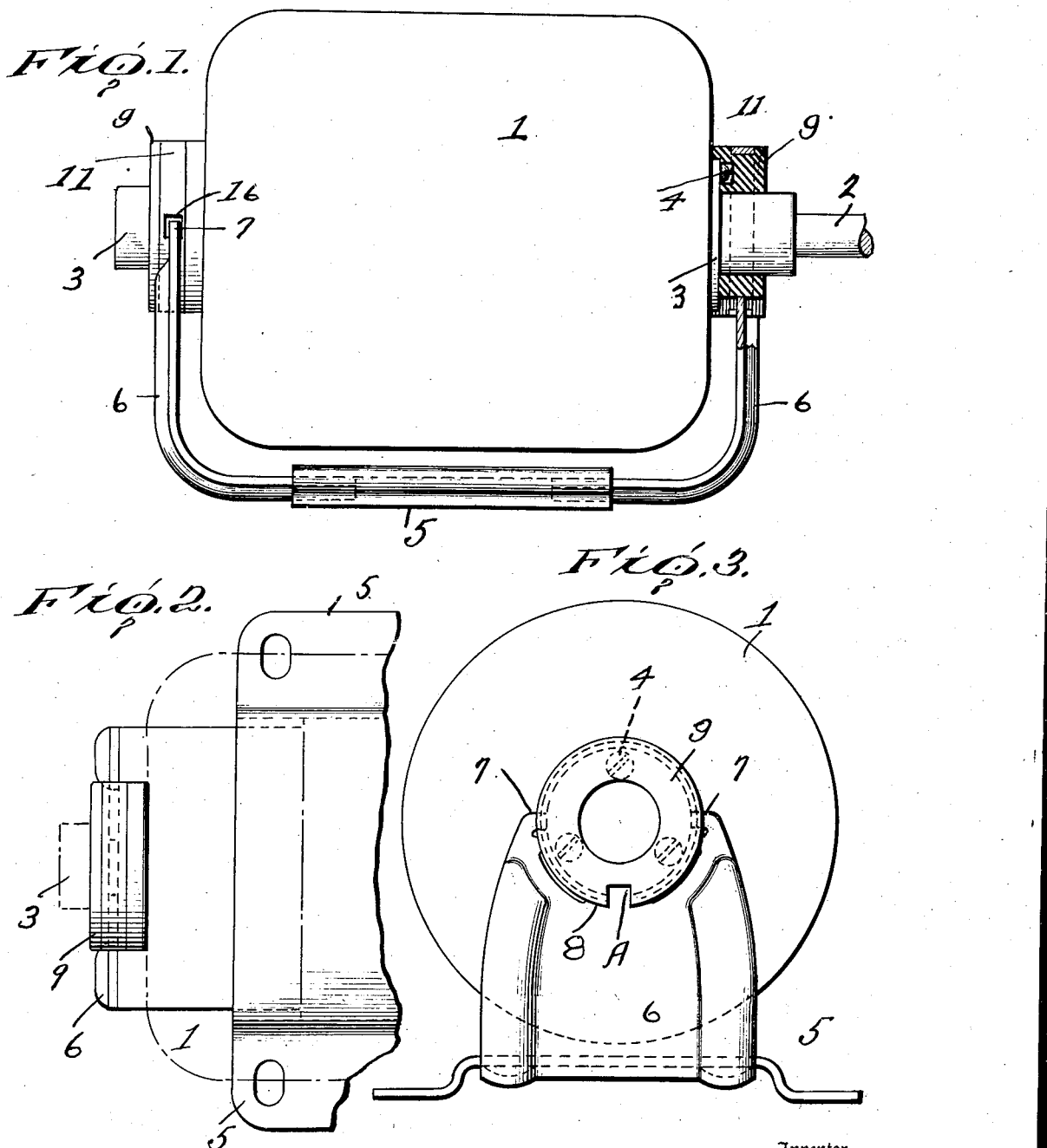
Inventor
W. J. MORRIS, JR.
Attorneys

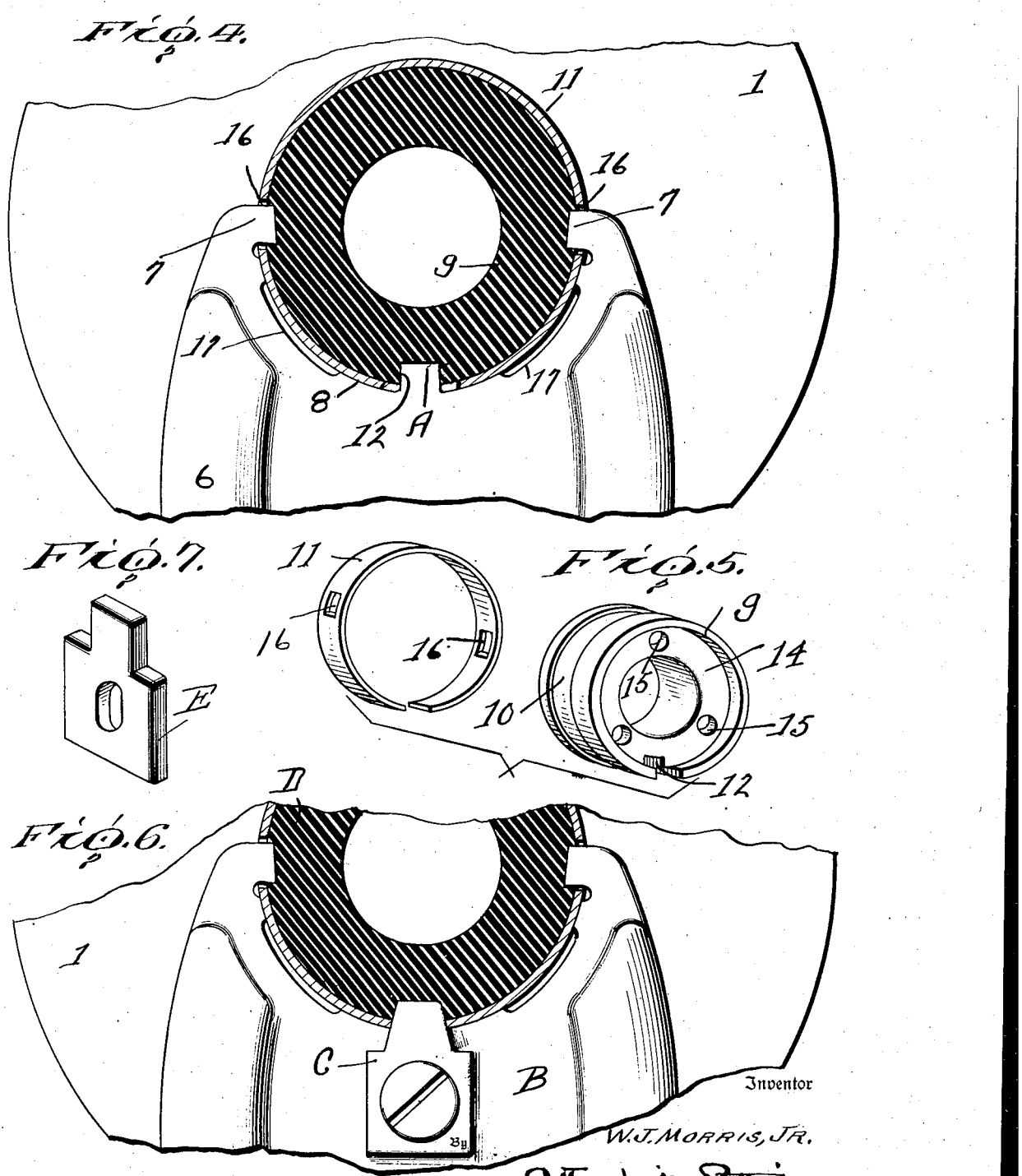

Patented Aug. 9, 1949

2,478,704

UNITED STATES PATENT OFFICE 2,478,704

RESILIENT MOTOR MOUNTING

William J. Morris, Jr., Owosso, Mich., assignor, by mesne assignments, to Redmond Company, Inc., Owosso, Mich., a corporation of Michigan Application December 29, 1944, Serial No. 570,317

1 Claim. (Cl. 248—26)

This invention relates to a resilient motor mounting for resiliently supporting an electric motor in a support such as a base, and the main object of the invention is to provide a resilient motor mounting which can be snapped into position within the brackets of the base in order securely to hold the motor in proper position with respect to the base and to prevent it from rotating therein.

Another object of my invention is to provide a novel resilient assembly composed of a tubular resilient member having an annular peripheral groove in which is formed a recess, the groove forming a seat for a split spring ring having its ends terminating at each side of the recess, so that a lug of the supporting bracket may extend into the recess for preventing the member from moving with relation to the bracket.

Another object of my invention is to provide a construction with a base formed of sheet metal of substantially U-shape, with brackets having recesses provided with hooks cooperating with the metal ring carried by the resilient member, whereby the ring and resilient member can be distorted in order to force the resilient assembly into position, and, when in position, the ring and resilient member are returned to their normal position in order to lock the assembly in position therein and to prevent the same from rotating.

In the drawings:

Fig. 1 is a side elevation of an electric motor constructed in accordance with my invention;

Fig. 2 is a detail bottom plan view;

Fig. 3 is an end elevational view;

Fig. 4 is a detail end elevational view, to enlarged scale, similar to Fig. 2, the assembly being broken away in cross-section, the ends of the split ring being spaced from the lug;

Fig. 5 is a perspective view of the resilient assembly, the parts being shown separated;

Fig. 6 is a view similar to Fig. 4, showing a modified form, with a detachable lug in position within the recess of the rubber member and in engagement with the ends of the ring for locking the assembly in the support; and Fig. 7 is a perspective view of a further modification of the detachable lug.

In the embodiment of my invention as herein shown, the electric motor, mounted in a frame or housing 1, consists of the usual field coil and armature carried by the motor shaft 2, as clearly shown in Fig. 1. The particular construction of the motor forms no part of my invention. In the construction shown, which is only for illustrative purposes, a hub 3 is secured at each end of the housing by screws 4, as clearly shown in Figs. 1 and 3. The illustration is not intended to limit the invention to use with a motor frame having separate hubs the hubs, for instance, could be formed as an integral part of the housing without departing from the spirit of the invention.

In the construction illustrated, the base is substantially U-shaped, and may be formed from sheet metal. The base may comprise a central base portion 5. The base has brackets 6 which may be separate from portion 5 and welded thereto. While the base has been illustrated in this particular manner, various changes can be made without departing from the spirit of the invention. Brackets 6 may, if desired, be formed exactly alike; description of one in such case, is sufficient. Each bracket has a recess formed at its upper end, the recess having the form of the arc of a circle. A pair of oppositely disposed, inwardly extending projections defining hooks 7 are at the outer ends of the arc. A central projection 8 is formed to provide a centrally disposed upstanding lug A, as clearly shown in Figs. 3 and 4.

The resilient assembly comprises a tubular resilient member 9 which is provided with an annular groove 10 adapted to receive a split spring ring 11. The groove is provided with a recess 12 to receive the lug A so as to prevent the same from rotating with relation to bracket 6. The resilient member 9 is preferably formed of rubber and has an annular recess 14 at one end and longitudinally disposed seats 15 adapted to receive the screws 4 employed for holding the hubs in position on the housing whereby the rubber tubular members are prevented from rotating with relation to the motor housing. The ring 11 can be formed of any desirable spring steel or high-carbon steel, and, has oppositely disposed oblong notches 16 which, when ring 11 is forced into the recess of the bracket, are adapted to receive the hooks 7.

The wall of the recess of the bracket is struck on the arc of a circle greater than the arc of the circle forming the circumference of ring 11 to produce a clearance 17 to receive the ring when it is deformed by the insertion of the assembly into the recess between hooks 7. Not only is the ring distorted, but tubular rubber member 9 also is distorted; in other words, the whole assembly, in being forced into position within the brackets, is distorted from a true circle to that of an oval. Thus when the assembly is snapped into position within the recess, hooks 7 enter openings 16 and lock member 9 in position in the bracket, and lug A prevents the assembly from rotating. Projection 8 from the recess holds the ring in annular groove 10 of rubber member 9 after ring 11 has been snapped into position and the ends of split ring 11 have been separated to hold the assembly in position.

In the form shown in Fig. 6, I provide a detachable lug C which enters the recess of the resilient member of the assembly D, and holds the ends of the split ring apart so as to form a positive lock for the assembly within bracket B. In this form, the lug is tapered, as shown, and is secured in position by a screw, or by any other suitable fastening member.

In the form of lug shown in Fig. 7, the side walls are straight and are inserted into the recess of the assembly to hold it from rotating. In this form, lug E can be adjusted and can either be used in connection with the form shown in Figs. 1 to 4, or in connection with the modification shown in Fig. 6.

In the form shown in Fig. 6, it will be noted that I have provided a positive lock for the split ring in the form of a lug which is inserted into the recess of the rubber member between the spaced ends of the split ring, to prevent the assembly from rotating, and also to eliminate the necessity for collapsing the split ring in order to remove the same.

While I have shown certain details of construction, my invention consists in providing a substantially U-shaped base formed of sheet metal having the legs of the U cut away to form recesses to produce hooks which snap into resilient assemblies formed of a rubber member having an annular groove to receive a resilient ring which has interlocking connection with the bracket.

In placing the motor in position within the base, a resilient assembly is placed over each hub, and the motor is placed over the recesses of the brackets. Then, by forcing downwardly on the assemblies they are distorted sufficiently to allow the assemblies to enter the recesses so that the hooks will enter the openings of the rings and lock the assemblies in position therein.

In Figs. 1 to 5, the ends of split spring ring 11 terminate short of lug A so as to allow the assembly to be inserted and removed from the bracket. In the modification, the lug engages the ends of the split spring ring to lock it in position in the bracket.

I claim:

A resilient motor mounting comprising a tubular rubber member, a circular split ring surrounding said tubular rubber member, the latter having a pre-formed slot extending radially inward from the outer periphery thereof, a basic supporting element beneath said tubular rubber member and ring, and a projection on said basic element adapted to extend into the space between the ends of said split ring and terminate within said radially extending slot to prevent angular shift in the position thereof, in relation to said basic supporting element.

WILLIAM J. MORRIS, JR.

REFERENCES CITED

The following references are of record in the file of this patent:

UNITED STATES PATENTS

| Number | Name | Date |
| --- | --- | --- |
| 2,036,058 | Lang | Mar. 31, 1936 |
| 2,042,666 | Kunkle | June 2, 1936 |
| 2,074,136 | Welch | Mar. 16, 1937 |
| 2,167,164 | Williams | July 25, 1939 |
| 2,355,115 | Schmidt | Aug. 8, 1944 |